US009976537B2

(12) United States Patent
Dahl et al.

(10) Patent No.: US 9,976,537 B2
(45) Date of Patent: May 22, 2018

(54) WIND TURBINE BLADE COMPRISING CYLINDRICAL METAL INSERTS IN A ROOT REGION THEREOF

(75) Inventors: Martin Dahl, Flensburg (DE); Bjarne Krab Mortensen, Billund (DK); Benjamin Hornblow, Copenhagen (DK)

(73) Assignee: LM WP PATENT HOLDING A/S, Kolding (DK)

( * ) Notice: Subject to any disclaimer, the term of this patent is extended or adjusted under 35 U.S.C. 154(b) by 777 days.

(21) Appl. No.: 14/111,055

(22) PCT Filed: Apr. 11, 2012

(86) PCT No.: PCT/EP2012/056533
§ 371 (c)(1),
(2), (4) Date: Oct. 10, 2013

(87) PCT Pub. No.: WO2012/140049
PCT Pub. Date: Oct. 18, 2012

(65) Prior Publication Data
US 2014/0030097 A1    Jan. 30, 2014

(30) Foreign Application Priority Data

Apr. 11, 2011  (EP) .................................... 11161894
Apr. 11, 2011  (EP) .................................... 11161896

(51) Int. Cl.
*F03D 1/06*    (2006.01)
*B29C 70/86*   (2006.01)
*B29L 31/08*   (2006.01)

(52) U.S. Cl.
CPC ............ *F03D 1/0658* (2013.01); *B29C 70/86* (2013.01); *F03D 1/0675* (2013.01);
(Continued)

(58) Field of Classification Search
CPC .... F03D 1/0658; F03D 1/0666; F03D 1/0675; F03D 1/0683; B29C 70/86; B23D 15/002; B23D 15/02; B23D 15/04; B23K 3/04
See application file for complete search history.

(56) References Cited

U.S. PATENT DOCUMENTS

| 7,163,378 | B2 * | 1/2007 | Kildegaard | ........... B29C 70/525 416/230 |
| 2008/0160248 | A1 * | 7/2008 | Jacobsen | ............. B29C 37/0082 428/113 |

(Continued)

FOREIGN PATENT DOCUMENTS

| DE | 196 25 426 A1 | 1/1998 |
| GB | 2472460 A | 2/2011 |

(Continued)

*Primary Examiner* — Igor Kershteyn
*Assistant Examiner* — Brian P Wolcott
(74) *Attorney, Agent, or Firm* — Nath, Goldberg & Meyer; Jerald L. Meyer; Tanya E. Harkins (57) ABSTRACT

A wind turbine blade for a wind turbine is a shell structure of a fiber-reinforced composite and comprises a root region and an airfoil region. The root region has a ring-shaped cross section and comprises a cylindrical insert 7 embedded in the fiber-reinforced polymer so as to substantially follow the circumference of the root region. The cylindrical insert is provided with a number of mutually spaced threaded bores 12, 15 in a first end 9 thereof being accessible from the outside.

19 Claims, 7 Drawing Sheets

(52) U.S. Cl.
CPC ... *B29L 2031/085* (2013.01); *F05B 2250/231* (2013.01); *F05B 2250/292* (2013.01); *F05B 2250/61* (2013.01); *F05B 2280/10* (2013.01); *F05B 2280/101* (2013.01); *F05B 2280/1071* (2013.01); *F05B 2280/6013* (2013.01); *F05B 2280/702* (2013.01); *Y02E 10/721* (2013.01); *Y02P 70/523* (2015.11)

(56) References Cited

U.S. PATENT DOCUMENTS

| | | | |
|---|---|---|---|
| 2008/0206059 A1* | 8/2008 | Hancock | F03D 1/0658 416/213 R |
| 2009/0324420 A1* | 12/2009 | Arocena De La Rua | B29C 70/865 416/248 |
| 2011/0044817 A1* | 2/2011 | Bendel | F03D 1/0658 416/204 R |

FOREIGN PATENT DOCUMENTS

| | | |
|---|---|---|
| WO | 03/057457 A1 | 7/2003 |
| WO | 2010/018225 A2 | 2/2010 |
| WO | 2011/035538 A1 | 3/2011 |

\* cited by examiner

WIND TURBINE BLADE COMPRISING CYLINDRICAL METAL INSERTS IN A ROOT REGION THEREOF

This is a National Phase Application filed under 35 U.S.C. 371 as a national stage of PCT/EP2012/056533, filed 11 Apr. 2012, claiming priority from European Application No. 11161896.3, filed Apr. 11, 2011, and No. 11161894.8, filed Apr. 11, 2011, the content of each of which is hereby incorporated by reference in its entirety.

TECHNICAL FIELD

The present invention relates to a wind turbine blade for a wind turbine rotor comprising a hub from which the wind turbine blade extends when mounted to the hub, the wind turbine blade including a shell structure of a fibre-reinforced composite material comprising fibres embedded in a polymer matrix, the wind turbine blade extending in longitudinal direction and having a profiled contour including a pressure side and a suction side as well as a leading edge and a trailing edge, said edges defining a chord plane therebetween, when seen in the longitudinal direction the profiled contour comprising a root region with a root end face, an airfoil region and optionally a transition region between the root region and the airfoil region, the root region having a ring-shaped cross section with a radially outer surface and a radially inner surface, the root region comprising a plurality of elongated fastening means arranged mutually spaced apart so as to substantially follow the circumference of the root region and allow access from the outside to the fastening means being used for mounting the blade to the hub.

BACKGROUND ART

Wind turbine blades and thereby also the root region thereof are often made by assembling two blade halves essentially corresponding to the suction side and the pressure side, respectively, along the chord plane. However, the blades may also be moulded in their entirety by so-called hollow moulding.

The root region of a known blade comprises layers of fibres forming an outer layer and an inner layer between which fastening members in the form of bushings are placed. A separately formed inserts may be placed between each pair of adjacent bushings, whereby the bushings are mutually separated by the inserts. The known inserts are made of glass fibres embedded in a suitable resin.

A potential problem in connection with wind turbine blades is load transfer from the fibre composite structure of the root region to the hub of the wind turbine. The connection and transfer of loads from the blade to the hub is inter alia provided by mounting the blade to the hub by screwing bolts into the bushings placed in the root or by means of nuts screwed onto stud bolts screwed into the bushings. In case the number of bolts and thereby the number of bushings has to be increased to handle a given load, remaining area of the fibre composite material between the bushings is reduced. This may result in the root connection being insufficiently supported to withstand the loads, whereby the connection between the blade root and the hub may fail since the bushings are insufficiently retained in the composite material and thus pulled out of the composite material of the root region. This is especially a problem when long and thereby heavy blades are to be used.

WO 2010/018225 provides a method of manufacturing a wind turbine blade comprising a steel wire or steel fibre-reinforced polymer matrix. However, the document does not address the problem of how the root region is to be designed to withstand extreme loads in the connection between the blade root and the hub.

GB 2 472 460 discloses a wind turbine blade with a connection piece having a u-shaped section for fitting to sides of a root laminate. The connection piece presents an alternative to bonded or laminated-in bushings.

DE 196 25 426 discloses a rock anchor comprising a core element made of polymer and provided with outer threads. The outer part of the rock anchor is reinforced with glass fibres. The anchor is particularly suited for non-conductive, non-magnetic and dielectric parts.

WO 03/057457 discloses a wind turbine blade comprising root end bushings with wedges provided in extension of the bushings.

WO 2011/035538 discloses an insert for a wind turbine blade root. The insert comprises a flat wedge-like portion, which is laminated into the root laminate, and a connection portion for fitting the insert to a mount. The connection portion is located outside the root laminate.

DISCLOSURE OF THE INVENTION

It is an object of the invention to provide a wind turbine blade with a root region overcoming at least one of the drawbacks of the prior art or at least provides a useful alternative.

According to a first aspect of the invention, a wind turbine blade of the type described above is provided with a root region in which an at least partly cylindrical metal insert is at least partially embedded in the root region so as to essentially follow the circumference of the root region, the partly cylindrical metal insert having a first end, a second end, a radially outer surface and a radially inner surface, and wherein the plurality of mutually spaced fastening means is accessible at the first end of the insert.

By the phrase "at least partially embedded" is to be understood that a longitudinal part or the insert in its entirety may be embedded in the composite material of the root region. Advantageously, the insert is bonded into the composite material of the root region. More advantageously, the insert is laminated into the composite material of the root region.

Hereby a very rigid root region is achieved, so that it is possible to provide the wind turbine blade with a smaller root diameter than known blades with metal bushings embedded in glass fibre-reinforced composite material. Further, it is possible to facilitate the manufacturing of the blade, as the fastening means may be provided in the insert, before the insert is embedded into the fibre reinforced polymer matrix, however, it is also possible to provide the fastening means in the insert after the insert has been embedded in the fibre-reinforced polymer matrix. Additionally, it is possible to provide the fastening means before or after assembling of the two blade halves when the blade is produced by connecting two blade halves.

According to an embodiment, the metal insert is a half cylinder, i.e. it extends over 180 degrees as seen in circumferential direction.

This embodiment is considered the preferred embodiment, as it can be used easily both when producing the blade by assembling two blade halves and when producing the blade by the so-called hollow moulding.

The blade preferably comprises two half-cylindrical inserts which are interconnected at end faces thereof by means of welding, soldering, brazing or gluing. However, the end faces of the inserts may also be connected mechanically, e.g. by mechanical means.

According to a further embodiment, the insert is a full cylinder, i.e. extends over 360 degrees in circumferential direction.

Thereby the need of connecting two half cylindrical inserts is eliminated.

In an embodiment, the insert tapers as seen in a direction from the first end towards the second end thereof.

The insert tapers at least over a portion of the length thereof, however, it may also taper over a longitudinal portion thereof. The insert may taper continuously; however, it may also taper stepwise.

According to a further embodiment, the outer and/or inner surface of the insert is corrugated.

Thereby an improved adherence between the insert and the polymer of the fibre-reinforced composite material is obtained. It will however be noted that any surface structure improving said adherence between the polymer and the insert may be used.

The insert may be made of iron or steel.

According to an additional embodiment, the insert comprises metal fibres or wires firmly fixed thereto and extended outwardly therefrom and being embedded in the polymer matrix of the fibre-reinforced composite material.

Hereby an improved retention of the insert is obtained, as both the outer surface of the insert and the fibres firmly fixed to the insert assist in retaining the insert in the polymer matrix of the fibre-reinforced composite material.

The metal fibres or wires may be firmly fixed to the outer and/or inner surface of the insert. Further, the metal fibres or wires may be firmly fixed to the second end of the insert. The metal fibres or wires may be made of iron or steel.

The metal fibres or wires may be coated in order to improve the adherence to the polymer matrix. As an example, iron or steel fibres or wires may be coated with another metal such as zinc or brass.

According to an embodiment, the fastening means is a threaded hole. Alternatively, the fastening means may be a threaded rod.

According to a further embodiment, the fibre-reinforced composite material of the root region comprises metal fibres. Further, the metal fibres, advantageously steel fibres, have material properties that are compatible with the fastening means, since these are typically made of metal and often steel. Thereby the rigidity of the root region is improved, and the retention of the insert thereby also improved.

In the root region of the wind turbine blade 20, 30, 40, 50, 60, 70, 80, 90 or 100% by volume of the fibres may be metal fibres, the remaining fibres of the root region being of a material different from the metal fibres, preferably glass and/or carbon fibres.

The cross-sectional dimension of the metal fibres or wires may be in a range between 0.04 mm and 1.0 mm, or in a range between 0.07 mm and 0.75 mm or in a range between 0.1 mm and 0.5 mm.

The polymer matrix of the fibre-reinforced composite material is preferable a resin such as polyester, epoxy or vinylester. However, any suitable polymer may be used for the polymer matrix.

The insert may also be composed of a number of individual fastening elements that are mutually bonded. Therefore, according to a second aspect, the invention provides a wind turbine blade of the aforementioned kind, wherein a root region of a wind turbine blade as described above is provided with fastening elements together forming a premade at least half-cylindrical fastening device, the fastening elements being made of metal and arranged so that lateral surfaces of the adjacent fastening elements abut each other and are permanently bonded to each other, said fastening device being at least partially embedded in the fibre-reinforced composite material of the root region.

By the phrase "at least partially embedded" is to be understood that a longitudinal part of the fastening device in its entirety may be embedded in the fibre-reinforced material. Advantageously, the fastening elements are laminated into the composite structure of the root.

The permanently fixed and mutually connected fastening elements forming the fastening device improve the rigidity of the root region as they are formed of metal and thereby allow for providing a smaller root diameter (and bolt connection diameter) or using longer blades with the same root diameter compared to existing designs.

Further, the present invention allows for forming fastening devices with different diameters by mutually bonding the fastening elements in different configurations. Thus, the fastening elements can be used for forming at least half-cylindrical fastening devices having different diameters.

As wind turbine blades and thereby also the root region thereof are often made by assembling two blade halves essentially corresponding to the suction side and the pressure side, respectively, along the cord plane, the fastening elements are preferably bonded to each other to form fastening devices having half-cylindrical shape, i.e. extending over 180° so as to be incorporated in the above-mentioned blade halves of the blade.

The fastening elements may be bonded by metallic bonds or by purely adhesive bonds, i.e. to say by being adhesively connected to each other. The fastening elements may, however, also be bonded by having interlocking abutting lateral surfaces.

According to an embodiment, the fastening elements are bonded by metallic bonds, i.e. by soldering, brazing or welding. In a preferred embodiment of the invention, the fastening elements are bonded to each other by welding, i.e. the elements are intimately connected with each other.

The bonding may be provided by using a filler material or without using such material.

According to an additional embodiment, the fastening elements are made of iron or steel.

In an additional embodiment, the fastening elements are bonded to each other by using an electric current such as a current in the range between 1,500-2,500 Amps, in a range between 1,800-2,200 Amps, or in the range between 1,900-2,100 Amps, so as to weld abutting materials of the abutting surfaces of the adjacent fastening elements to each other.

According to an additional embodiment, at least some of the fastening elements of the fastening device comprise metal fibres or wires firmly fixed thereto and extending outwardly therefrom and being embedded in the polymer matrix of the fibre-reinforced composite material.

The majority of the blade may be reinforced with fibres of another type, typically glass fibres or carbon fibres. In particular the profiled region of the blade having an airfoil profile and the transition region may be reinforced by such fibres. Thereby only the root region and optionally only the region, wherein the bushings are laminated into the composite structure, may be reinforced by metal fibres, advantageously being steel fibres.

Thereby, an improved retention of the fastening device provided by the mutually bonded fastening elements is provided as the metal fibres extending therefrom contribute to the retention of the fastening device.

50-100% of the fastening elements of the fastening device may be provided with metal fibres or wires extending therefrom. According to a further embodiment of the invention, the metal fibres or wires are firmly fixed to the second end of the fastening elements of the fastening device.

According to an additional embodiment of the invention, the fibres or wires extending from the fastening elements are made of iron or steel.

The fibres or wires may be firmly fixed to the fastening elements of the fastening device by gluing, soldering, brazing or welding. It is, however, also possible to connect the fibres or wires to the fastening elements by mechanical means so as clamping an end of the wires between portions of the fastening element.

According to an embodiment, the fastening means is a threaded hole in the fastening elements of the fastening device. It should, however, be noted that the fastening means may also be a threaded rod of the fastening elements of the fastening device.

According to a further embodiment of the invention, the first lateral surface of the fastening elements is a substantially concave surface in a cross-sectional view, and the second lateral surface of the fastening elements is a substantially convex surface in a cross-sectional view.

Thereby, abutting adjacent surfaces of adjacent fastening elements are arranged close to each other when forming connection devices having different diameters.

According to a further embodiment of the invention, at least one and preferably both the lateral surfaces of the fastening elements are planar. One or both the lateral faces may, however, also be corrugated.

According to a further embodiment of the invention, the outer periphery of the fastening elements of the fastening device is provided with a substantially cylindrical outer periphery.

Circular cylindrical fastening elements are particularly suitable to manufacture and additionally, it is convenient to arrange such fastening elements in abutment with each other to form an at least half-cylindrical fastening device by mutually bonding the fastening elements to each other.

The fibre-reinforced composite material of the wind turbine blade may comprise metal fibres, preferably iron or steel fibres, at least in the root region thereof.

Thereby, the stiffening of the root region and thereby the retention of the fastening device formed by the fastening elements are improved.

The root region of the wind turbine blade made comprise 20, 30, 40, 50, 60, 70, 80, 90, 100% by volume steel or iron fibres, the remaining fibres being of a material differing from that of the iron or steel fibres, preferably glass and/or carbon fibres.

The fastening device formed by the mutually bonded fastening element may taper in the longitudinal direction of the blade as seen from the root towards the tip. The fastening device may, however, also taper in the opposite direction.

The cross-sectional dimension of the metal fibres or wires may be in a range between 0.04 and 1.0 mm, or in a range between 0.07 mm and 0.75 mm, or in a range between 0.1 mm and 0.5 mm.

BRIEF DESCRIPTION OF THE DRAWINGS

The invention is explained in greater detail below with reference to the drawings in which.

DETAILED DESCRIPTION OF THE DRAWINGS

Figure 1:
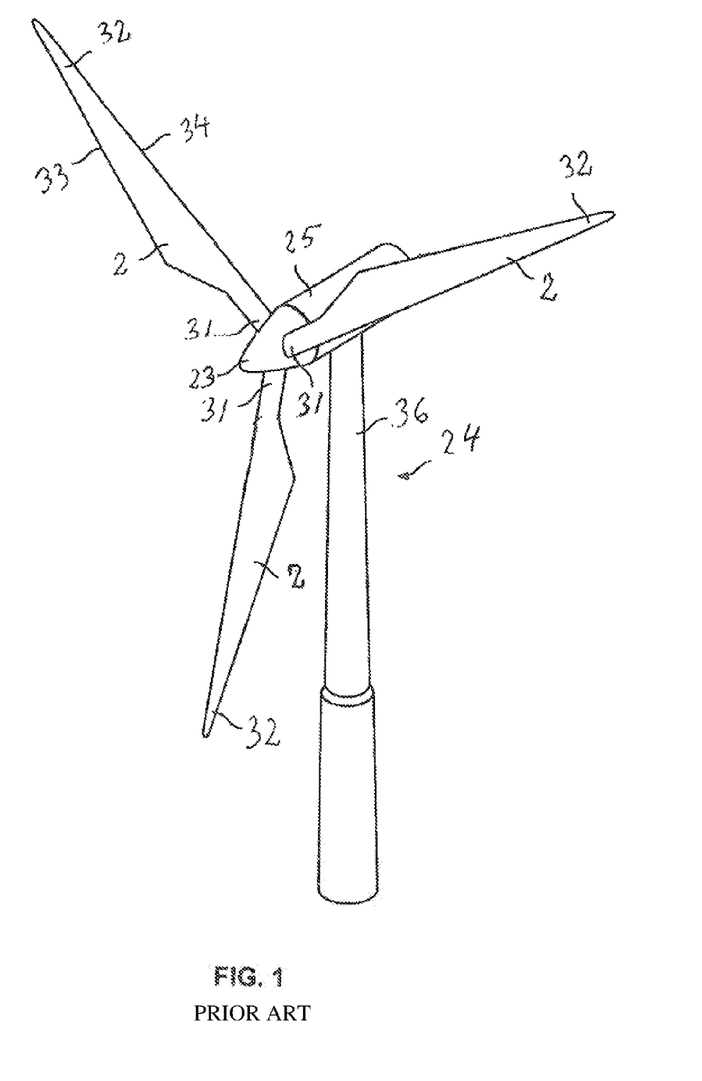
FIG. 1 shows a wind turbine.

FIG. 1 illustrates a conventional, modern upwind wind turbine 24 according to the so-called "Danish concept" with a tower 36, a nacelle 25 and a rotor with a substantially horizontal rotor shaft. The rotor includes a hub 23 and three blades 2 extending radially from the hub 23, each having a blade root 31 nearest the hub, and a blade tip 32 furthest from the hub 23.

Figure 2:
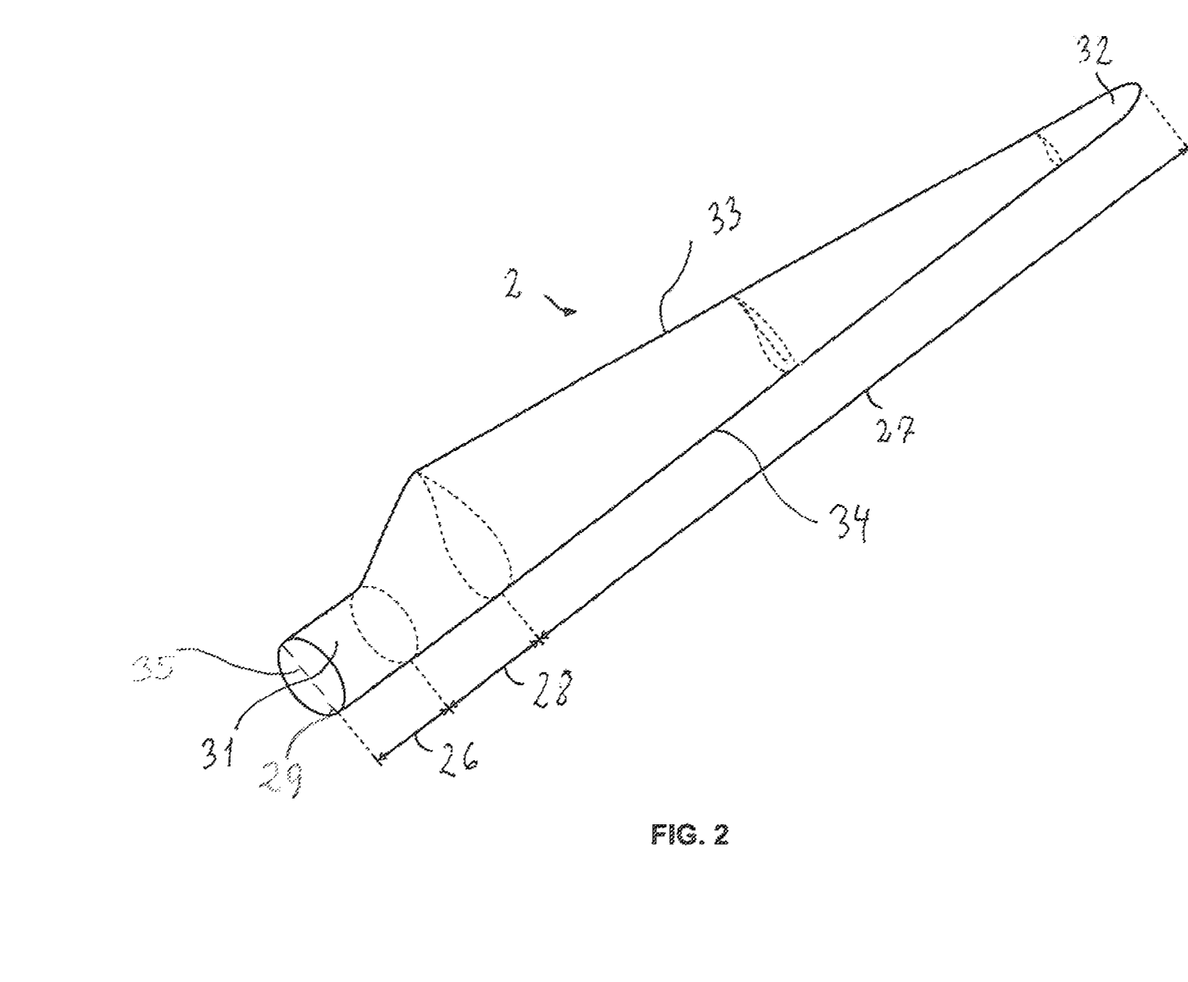
FIG. 2 is a diagrammatic perspective view of a wind turbine blade according to the invention.

As evident seen from FIG. 2, the blade 2 comprises a root region 26 with a root end face 29 closest to the hub, an airfoil region 27 furthest away from the hub, and a transition area 28 between the root region 26 and the airfoil region 27. The airfoil region 27 has an ideal or almost ideal blade shape, whereas the root region 26 has a substantially circular cross section, which reduces storm loads and makes it easier and safer to mount the blade 2 to the hub 23. Preferably, the diameter of the blade root 31 is constant along the entire root region 26. The transition region 28 has a shape gradually changing from the circular shape of the root region 26 to the airfoil profile of an airfoil region 27. The width of the transition region 28 increases substantially linearly with increasing distance from the hub 23.

The blade is often made of two blades halves assembled by being glued or bolted together substantially along a chord plane 35 of the blade. In the embodiment described in the following the blade including the root region thereof is made in two blade halves. The blade 2 comprises a leading edge 34 facing the rotational direction of the blade 2 when the blade 2 is mounted on the hub 23 and a trailing edge 33 facing in the opposite direction of the leading edge 34. The chord plane 35 extends between the leading edge 34 and the trailing edge 33 of the blade 2. It should be noted that the chord plane does not necessarily run straight over its entire extent, since the blade may be twisted and/or curved, thus providing a chord plane with a correspondingly twisted and/or curved course, this being most often the case in order to compensate for the local velocity of the blade being dependent on the radius from the hub. Due to the circular cross section, the root region 26 does not contribute to the production of the wind turbine and, in fact, it lowers the production slightly due to the wind resistance.

Figure 3:
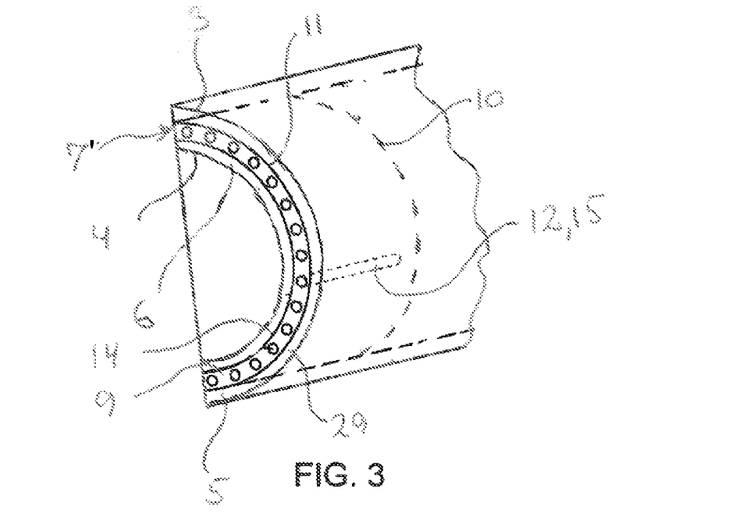
FIG. 3 is a perspective view of a portion of a root region of the first embodiment of a wind turbine blade according to the invention.
Figure 4:
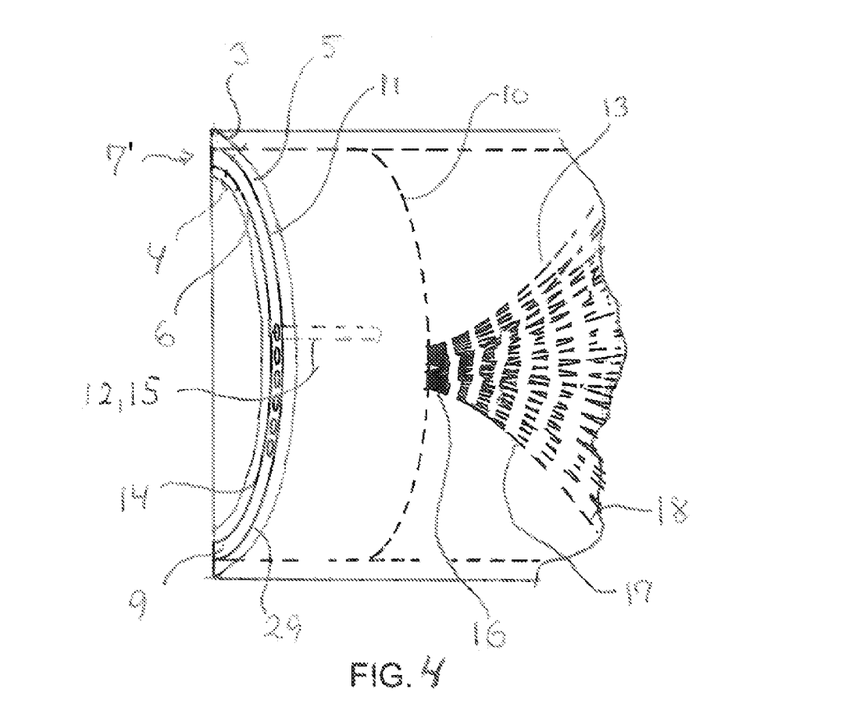
FIG. 4 is a perspective view of a portion of a root region of a second embodiment of a wind turbine blade according to the invention.
Figure 5:
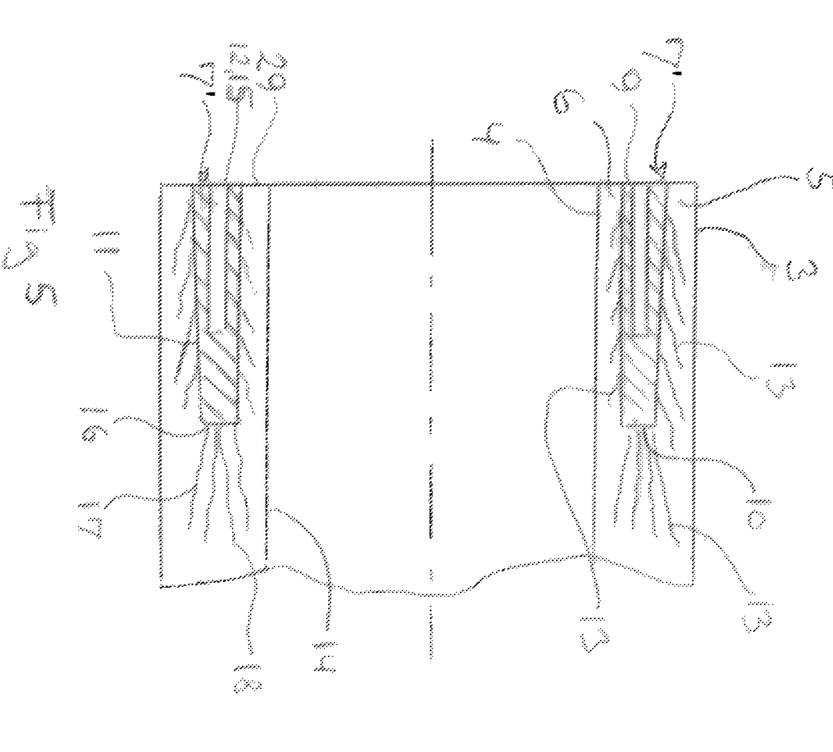
FIG. 5 is a cross-sectional view of the root region of a third embodiment of a wind turbine blade according to the invention.

As shown in FIG. 3-5 the blade including the root region is formed as a shell structure. The shell structure of the root region is ring-shaped and comprises an outer surface 3 formed by an outer layer 5 of a fibre-reinforced polymer matrix such as glass fibres and/or carbon fibres and/or metal fibres and a resin, such as epoxy, polyester or vinylester, and an oppositely arranged inner surface 4 formed by an inner layer 6 being made of the same material as the outer layer 5.

As shown in FIG. 3-5 a half-cylindrical metal insert 7' is arranged between the outer 5 and inner 6 layer, i.e. embedded in the fibre-reinforced composite material formed by the above fibres and the above polymer.

The semi-cylindrical metal insert 7' has a first end 9 and an opposite second end 10. The first end 9 of the insert 7' is arranged at a root end face 29 of the wind turbine blade. The insert 7' further has an outer surface 11 and an inner surface 14. Mutually spaced fastening means which in the shown embodiments are formed by inner threads 15 in a bore 12 extending into the insert from the first end 9 thereof.

As seen from FIG. 3-5, the insert 7' is arranged so as to substantially follow the circumference of the root region. Correspondingly, the bores 12 with the threads 15 are arranged mutually spaced apart, so as to also substantially follow the circumference of the root region, and further so as to allow access thereto from the outside, so as to be able to engage bolts in the threads for mounting the blade to the hub of the wind turbine.

In FIGS. 3 and 4 the semi-cylindrical insert 7' has a circular cross-section and a constant wall thickness over the entire length thereof. Further, in respect to FIGS. 3 and 4 it should be mentioned that these figures only disclose a portion of a root region of a blade half of a blade, which is manufactured by assembling two blade halves.

FIG. 4 discloses an insert essentially corresponding to that shown in FIG. 3, however, being additionally provided with metal fibres 13, preferably steel or iron fibres or wires. As shown in FIG. 4, the metal fibres 13 have a first end 16 being firmly fixed to the second end 10 of the insert 7', and an outwardly extending portion 17 ending in a second end 18. The outwardly extending portion 17 of the fibres or wires is embedded in the fibre-reinforced composite material of the root region formed by the above mentioned fibres and polymer matrix. The outwardly extending fibres 13 assist in retaining the insert in the root region. Although it is not shown in FIG. 4, metal fibres may also be firmly fixed to the outer and/or inner surface 3, 4 of the insert 7' in order to thereby further improve the retention of the insert 7'.

FIG. 5 discloses a longitudinal sectional view of a portion of the root region of a wind turbine blade formed of two blade halves being mutually assembled. The insert 7' shown in FIG. 5 differs from those shown in FIGS. 3 and 4 in that the outer surface 11 thereof tapers as seen in the direction from the first end 9 of the insert, towards the second end 10 of the insert 7'. Thereby, the thickness of the wall of the insert decreases from the first to the second end thereof. Metal fibres 13 are firmly fixed to the outer surface 11 of the insert 7', the inner surface 14 of the insert and to the second end 10 of the insert 7'. The metal fibres extend outwardly from the mentioned surfaces and are embedded in the polymer matrix of the fibre-reinforced composite material of the root region. Finally, the insert 7' is provided with a number of mutually spaced bores 12 with an inner thread 15.

Although it is not shown in any of the embodiments, the outer and inner surface of the insert may be corrugated or provided with another surface structure so as to improve the adherence between the mentioned surfaces and the polymer matrix.

Additionally, it should be mentioned that the outer and/or inner surface may generally taper over the entire length thereof, or only over a portion thereof.

Finally, it should be noted that the insert, instead of being a semi-cylindrical insert as shown in FIG. 3-5, could be a full cylindrical insert, i.e. extend over 360 degrees as seen in circumferential direction.

Figure 6:
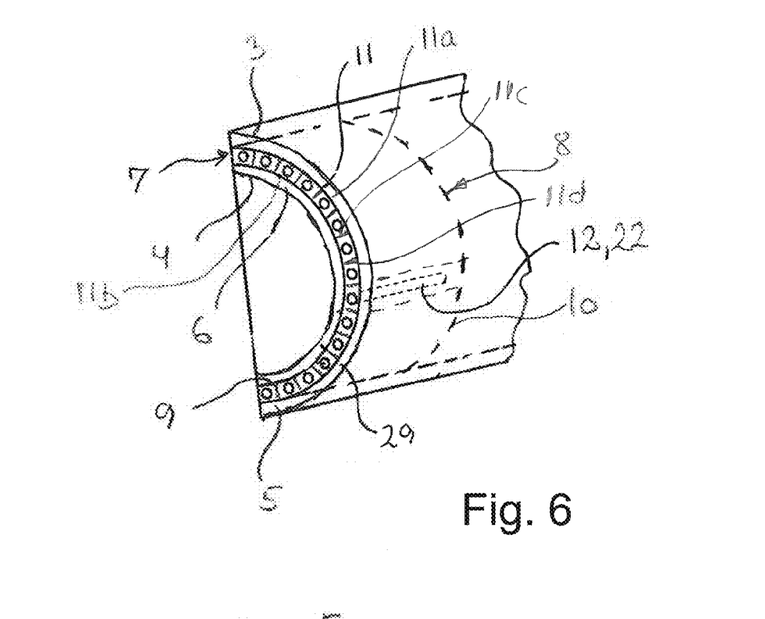
FIG. 6 shows a portion of a root region of a first embodiment of a wind turbine blade according to the invention provided with a first embodiment of a pre-made fastening device.

FIG. 6 shows an embodiment similar to the one shown in FIG. 3. Therefore like parts are marked with the same reference numeral. In the embodiment shown in FIG. 6, the root region of the blades comprises a half-cylindrical fastening device 8, being formed by a number of elongated fastening members 7. Each fastening member comprises an outer periphery 11 comprising a radially outer surface 11a, an opposite radially inner surface 11b, a first lateral face 11c, and an opposite second lateral face 11d. Further, each fastening element is provided with a bore 12 with an inner thread 22. The fastening elements have a first end 9 and an opposite second end 10. The first ends of the fastening elements are arranged at the root end face 29 of the wind turbine blade.

The elongated fastening elements 7 have an essentially rectangular or trapezium-shaped cross section and are mutually connected at lateral surfaces 11c, 11d thereof by said surfaces being welded together so as to form the semi-cylindrical fastening device 8. The semi-cylindrical fastening device 8 is arranged between an outer layer 5 of a fibre-reinforced polymer matrix advantageously of glass fibres and/or carbon fibres and an inner layer 6 formed of the same material as the outer layer 5. The outer layer 5 has an outer surface 3, and the inner layer 6 has an inner surface 4.

In addition to comprising glass and/or carbon fibres, the inner and outer layer 6, 5 of the root region may also comprise other fibres such as metal fibres, preferably iron or steel fibres.

The welded connection between the fastening elements 7 may be provided by providing a current to the fastening elements. The amperage of the current may be in the range between 1,500-2,500 Amps, in the range between 1,800-2,200 Amps, or in the range between 1,900-2,100 Amps. In this way, the adjacent surfaces of the adjacent fastening elements are directly connected to each other. It should, however, be noted that the adjacent surfaces of the fastening elements may also be connected by using a filler material.

Figure 7:
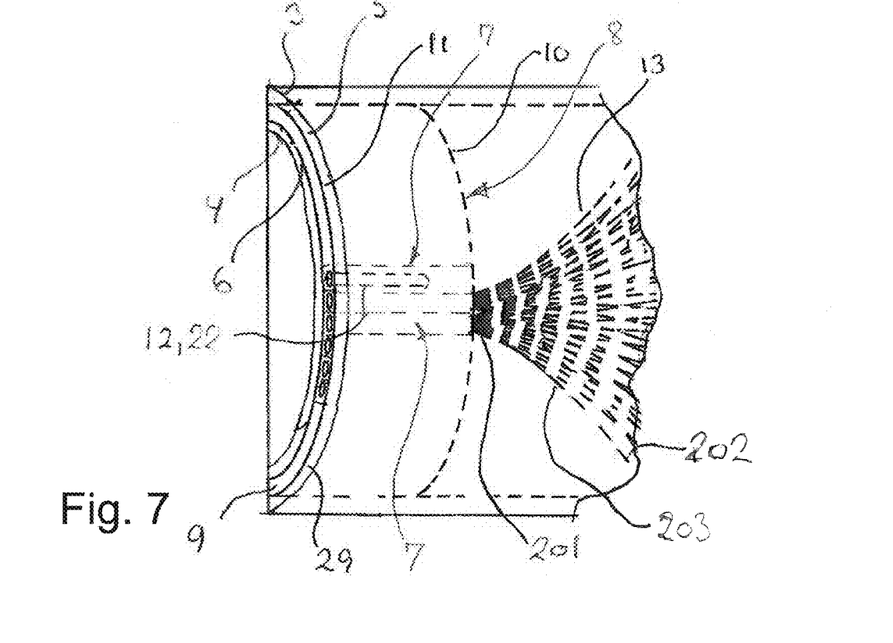
FIG. 7 shows a portion of a root region of a second embodiment of a wind turbine blade according to the invention provided with a second embodiment of a pre-made fastening device.

FIG. 7 shows an embodiment similar to the one shown in FIG. 4. Therefore like parts are marked with the same reference numeral. In the second embodiment shown in FIG. 7, the elongated fastening elements 7 being mutually connected to form the fastening device 8 are provided with metal fibres, preferably iron or steel fibres 13 firmly fixed thereto. As shown, the metal fibres 13 have a first fibre end 201 being firmly connected to the second end 10 of the fastening elements and an outwardly extending portion 203 having a second fibre end 202. The outwardly extending portion of the metal fibres is embedded in the polymer of the fibre-reinforced composite material of the root region.

As shown in FIG. 7, the metal fibres extend from the second end 10 of the fastening elements 7 so as to form a fan, whereby the distance between the second end 202 of adjacent fibres on average is smaller than the distance between the first end of adjacent fibres. In an alternative embodiment the fibres extend substantially unidirectionally from the second end 10 of the fastening device 7. The fibres may be individual fibres or filaments or form a fabric.

In the previously described embodiments, the fastening elements 7 of the fastening device 8 are provided with a constant cross-sectional area over the entire extend thereof.

Figure 8:
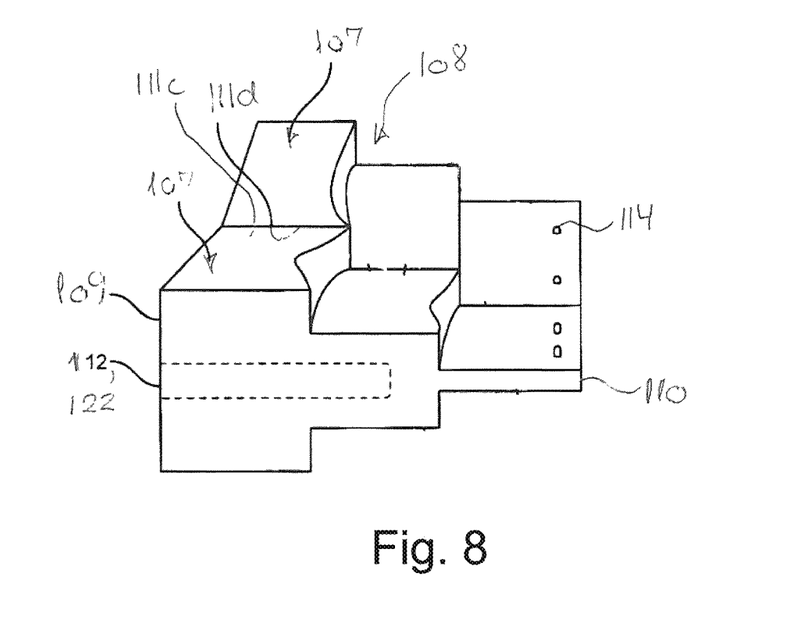
FIG. 8 shows a portion of a third embodiment of a fastening device formed by mutually connected fastening elements.

FIG. 8 discloses a portion of a third embodiment of a fastening device 108 formed of mutually connected fastening elements 107. In FIG. 8, two elongated fastening elements 107 are shown. They are abutting each other along lateral faces 111c, 111d and bonded to each other along these faces, such as by welding. Each elongated element 107 has a first end 109 and an opposite second end 110 and additionally a bore 112 provided with an inner thread 122. As seen in FIG. 8, the elongated elements 107 are tapering stepwise from the first end 109 thereof towards the second end 110 thereof. Further, it should be noted that the fastening elements 107 are provided with means illustrated by openings 114 for connecting metal fibres, preferably steel or iron fibres, to the second end 110 of the fastening elements 107.

Figure 9:
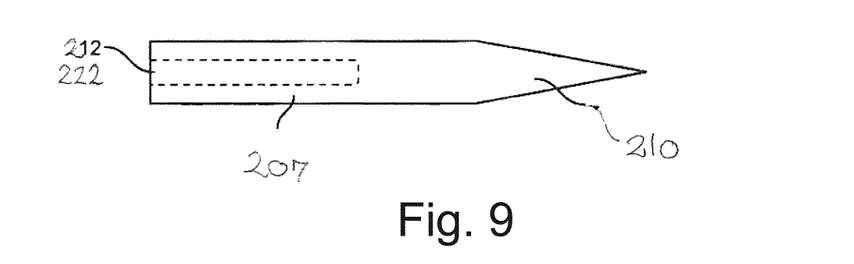
FIG. 9 shows an additional embodiment of a fastening element for forming a half-cylindrical fastening element.

FIG. 9 illustrates an embodiment of an elongated fastening element 207 for forming a fastening device by mutually connecting a number of said fastening elements, the fastening element being shown as a constantly tapering second end 210 and a bore 212 provided with an inner thread 222.

Figure 10:
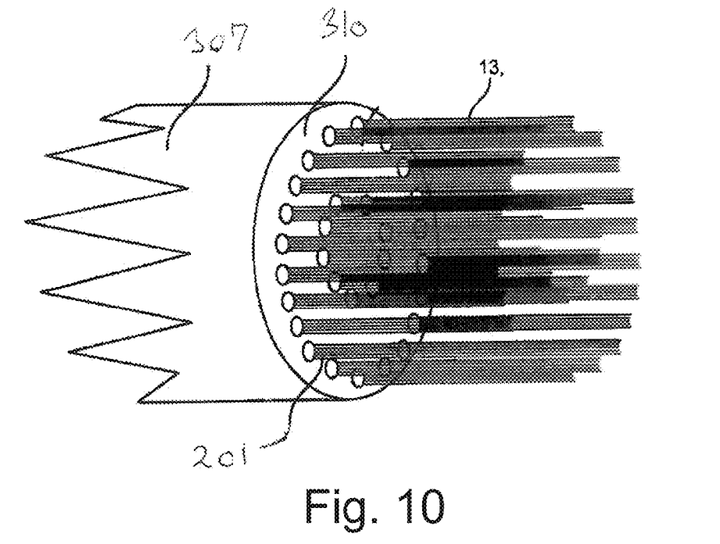
FIG. 10 shows a cylindrical fastening element provided with metal fibres firmly attached to a second end thereof.

FIG. 10 discloses a fastening element 307 for forming a fastening device by connecting a number thereof so as to form the half-cylindrical fastening device. The elongated fastening element 307 has a circular cross section and is, at the second end 310 thereof, provided with a number of metal fibres preferably steel or iron fibres 13. The first fibre end 201 is firmly fixed to the second end 310 of the elongated fastening element 307, and a portion 203 of the metal fibres extends outwardly from said second end so as to be embedded in the polymer matrix of the fibre-reinforced composite material.

Figure 11:
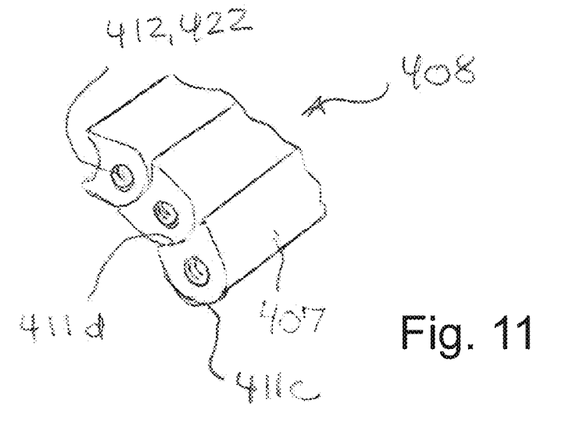
FIG. 11 shows a portion of a fastening device formed of mutually connected fastening elements having a convex and a concave lateral side wall.

FIG. 11 shows a portion of a fastening device 408 formed of mutually spaced elongated fastening elements 407. The fastening elements 407 are provided with a first lateral face 411c being convex, advantageously circular cylindrical, in a cross-sectional view and an opposite second lateral face 411c being concave, advantageously circular cylindrical, in a cross-sectional view. The first and the second lateral face abut each other and are mutually permanently connected such as by welding. Further, each fastening element 407 provided with a bore with a thread.

LIST OF REFERENCE NUMERALS

2 Wind turbine blade
3 Outer surface of root
4 Inner surface of root
5 Outer layer
6 Inner layer
7' Insert
7, 107, 207, 307, 407 Elongated fastening element
8, 108, 408 Fastening device
9 First end of insert
9, 109 First end of fastening element
10 Second end of insert
10, 210, 310 Second end of fastening element
11 Outer surface of insert/fastening element
11a Radially outer surface
11b Radially inner surface
11c, 111c, 411c First lateral face
11d, 111d, 411d Second lateral face
12, 112, 212, 412 Bore
13 Metal fibres
14 Inner surface of insert
15 Thread in bore
16 First end of fibres
17 Outwardly extending portion of fibres
18 Second end of fibres
22, 122, 222, 422 Inner thread
23 Hub
24 Wind turbine
25 Nacelle
26 Root region
27 Airfoil region
28 Transition region
29 Root end face
31 Blade root
32 Blade tip
33 Trailing edge
34 Leading edge
35 Chord plane
36 Tower
114 Opening
201 First fibre end
202 Second fibre end
203 Outwardly extending portion of metal fibres

The invention claimed is:

1. A wind turbine blade for a wind turbine rotor comprising a hub from which the wind turbine blade extends when mounted to the hub, the wind turbine blade including a shell structure of a fibre-reinforced composite material comprising fibres embedded in a polymer matrix, the wind turbine blade extending in longitudinal direction and having a profiled contour including a pressure side and a suction side as well as a leading edge and a trailing edge, said edges defining a chord plane therebetween, when seen in the longitudinal direction the profiled contour comprising a root region with a root end face, an airfoil region and a transition region between the root region and the airfoil region, the root region having a ring-shaped cross section with an outer surface and an inner surface, the root region comprising a plurality of fastening means arranged so as to substantially follow the circumference of the root region and allow access from outside to the fastening means being used for mounting the blade to the hub, wherein an at least partly cylindrical metal insert made fully of metal comprising a plurality of said fastening means is at least partially embedded in the root region so as to essentially follow the circumference of the root region with the plurality of said fastening means of the at least partly cylindrical metal insert arranged so as to follow the ring-shaped cross-section of the root region, the at least partly cylindrical metal insert having a first end and a second end, a radially outer surface and a radially inner surface, and wherein the plurality of said fastening means is accessible at the first end of the insert.

2. The wind turbine blade according to claim 1, wherein the insert is a half cylinder, extending over 180 degrees in a circumferential direction.

3. The wind turbine blade according to claim 1, wherein the insert is a full cylinder, extending over 360 degrees in a circumferential direction.

4. The wind turbine blade according to claim 1, wherein the insert tapers from the first end towards the second end.

5. The wind turbine blade according to claim 4, wherein the insert tapers at least over a portion of a length thereof.

6. The wind turbine blade according to claim 4, wherein the insert tapers continuously.

7. The wind turbine blade according to claim 1, wherein the outer and/or inner surface of the insert is corrugated.

8. The wind turbine blade according to claim 1, wherein the insert is made of iron or steel.

9. The wind turbine blade according to claim 1, wherein the insert comprises metal fibres or wires fixed thereto and extending outwardly therefrom and being embedded in the polymer matrix of the fibre-reinforced composite material.

10. The wind turbine blade according to claim 9, wherein the metal fibres or wires are fixed to the outer and/or inner surface of the insert.

11. The wind turbine blade according to claim 9, wherein the metal fibres or wires are firmly fixed to the second end of the insert.

12. The wind turbine blade according to claim 9, wherein the metal fibres or wires are made of iron or steel.

13. The wind turbine blade according to claim 1, wherein the fastening means is a threaded hole.

14. The wind turbine blade according to claim 1, wherein the fastening means is a threaded rod.

15. The wind turbine blade according to claim 1, wherein the fibre-reinforced composite material of the root region comprises metal fibres.

16. The wind turbine blade according to claim 15, wherein the metal fibres are steel fibres or iron fibres.

17. The wind turbine of claim 1, wherein the fastening means are mutually spaced.

18. A wind turbine blade for a wind turbine rotor comprising a hub from which the wind turbine blade extends when mounted to the hub, the wind turbine blade including a shell structure of a fibre-reinforced composite material comprising fibres embedded in a polymer matrix, the wind turbine blade extending in longitudinal direction and having a profiled contour including a pressure side and a suction side as well as a leading edge and a trailing edge, said edges defining a chord plane therebetween, when seen in the longitudinal direction the profiled contour comprising a root region with a root end face, an airfoil region and a transition region between the root region and the airfoil region, the root region having a ring-shaped cross section with an outer surface and an inner surface, the root region comprising a plurality of fastening means arranged so as to substantially follow the circumference of the root region and allow access from outside to the fastening means being used for mounting the blade to the hub, wherein an at least partly cylindrical metal insert made fully of metal comprising a plurality of said fastening means is at least partially embedded in the root region so as to essentially follow the circumference of the root region, the at least partly cylindrical metal insert having a first end and a second end, a radially outer surface and a radially inner surface, and wherein the plurality of said fastening means is accessible at the first end of the insert, and wherein the insert is a half cylinder, extending over 180 degrees in a circumferential direction.

19. A wind turbine blade for a wind turbine rotor comprising a hub from which the wind turbine blade extends when mounted to the hub, the wind turbine blade including a shell structure of a fibre-reinforced composite material comprising fibres embedded in a polymer matrix, the wind turbine blade extending in longitudinal direction and having a profiled contour including a pressure side and a suction side as well as a leading edge and a trailing edge, said edges defining a chord plane therebetween, when seen in the longitudinal direction the profiled contour comprising a root region with a root end face, an airfoil region and a transition region between the root region and the airfoil region, the root region having a ring-shaped cross section with an outer surface and an inner surface, the root region comprising a plurality of fastening means arranged so as to substantially follow the circumference of the root region and allow access from outside to the fastening means being used for mounting the blade to the hub, wherein an at least partly cylindrical metal insert made fully of metal comprising a plurality of said fastening means is at least partially embedded in the root region so as to essentially follow the circumference of the root region, the at least partly cylindrical metal insert having a first end and a second end, a radially outer surface and a radially inner surface, and wherein the plurality of said fastening means is accessible at the first end of the insert, and wherein the insert is a full cylinder, extending over 360 degrees in a circumferential direction.

* * * * *